United States Patent
Mottola

(10) Patent No.: US 8,429,840 B2
(45) Date of Patent: Apr. 30, 2013

(54) MEDALLION DISPLAY APPARATUS FOR MOTORCYCLES

(76) Inventor: John David Mottola, St. Cloud, FL (US)

(*) Notice: Subject to any disclaimer, the term of this patent is extended or adjusted under 35 U.S.C. 154(b) by 0 days.

(21) Appl. No.: 12/783,461

(22) Filed: May 19, 2010

(65) Prior Publication Data

US 2010/0293826 A1   Nov. 25, 2010

Related U.S. Application Data

(60) Provisional application No. 61/216,594, filed on May 19, 2009, provisional application No. 61/274,622, filed on Aug. 19, 2009.

(51) Int. Cl.
G09F 21/04 (2006.01)

(52) U.S. Cl.
USPC ............................ 40/590; 123/198 E

(58) Field of Classification Search ............. 40/590, 40/643, 661.05
See application file for complete search history.

(56) References Cited

U.S. PATENT DOCUMENTS

| | | | | |
|---|---|---|---|---|
| 1,514,464 A * | 11/1924 | Ruckman | | 40/643 |
| 3,678,705 A * | 7/1972 | Korwin | | 63/18 |
| D315,119 S * | 3/1991 | Freeman et al. | | D11/115 |
| 5,027,537 A * | 7/1991 | Freeman et al. | | 40/210 |
| 6,752,119 B2 * | 6/2004 | Coleman | | 123/195 C |
| 6,805,213 B2 * | 10/2004 | Seffernick et al. | | 180/68.6 |
| 7,343,705 B2 * | 3/2008 | Kruse | | 40/590 |
| 7,437,840 B2 * | 10/2008 | Ratmansky et al. | | 40/27.5 |
| 2006/0209549 A1 * | 9/2006 | Valdez | | 362/485 |
| 2007/0277724 A1 * | 12/2007 | Sammons | | 116/28 R |
| 2009/0021038 A1 * | 1/2009 | Ohzono | | 296/37.16 |
| 2010/0300398 A1 * | 12/2010 | Weymouth, Jr. | | 123/198 E |

* cited by examiner

*Primary Examiner* — Joanne Silbermann
*Assistant Examiner* — Kristina Junge
(74) *Attorney, Agent, or Firm* — The Miller Law Offices PLC; Steven J. Miller, Esq.

(57) ABSTRACT

A display apparatus for a medallion in the form of a motorcycle engine timing cover with an integral recess for receiving and retaining the medallion for display on the motorcycle includes a plurality of screw holes arrayed around the periphery of the timing cover to correspond to the original screw holes in the engine. A center aperture in the timing cover member enables access to a medallion retained in the cover from the back side of the cover, when the cover is not installed on the motorcycle. The integral recess in the cover preferably comprises a shallow counterbore in the center of the front surface of the timing cover, coaxial with the center aperture. The recess may be defined by a circumferential ridge on the front surface of the cover, or as a counterbore into the front surface of the cover.

8 Claims, 1 Drawing Sheet

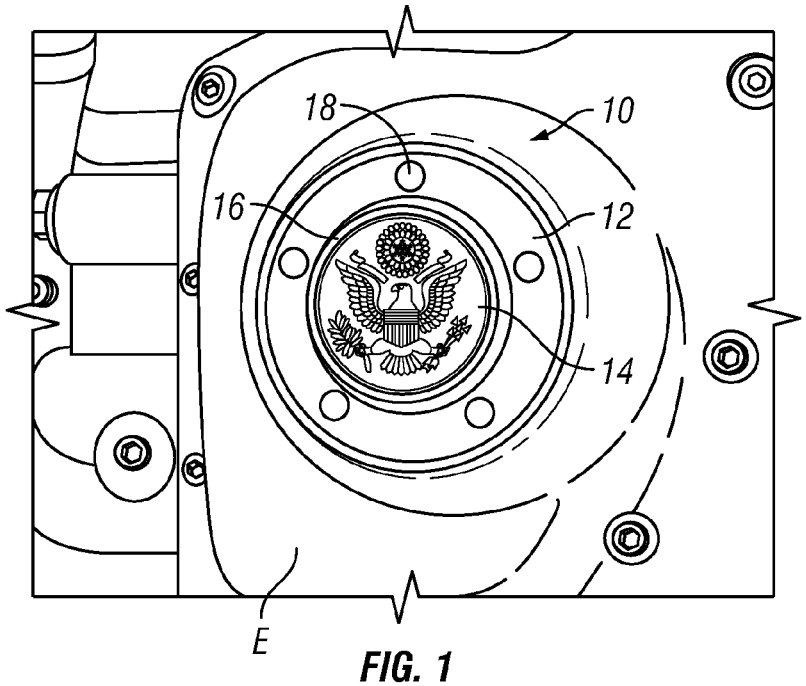
FIG. 1
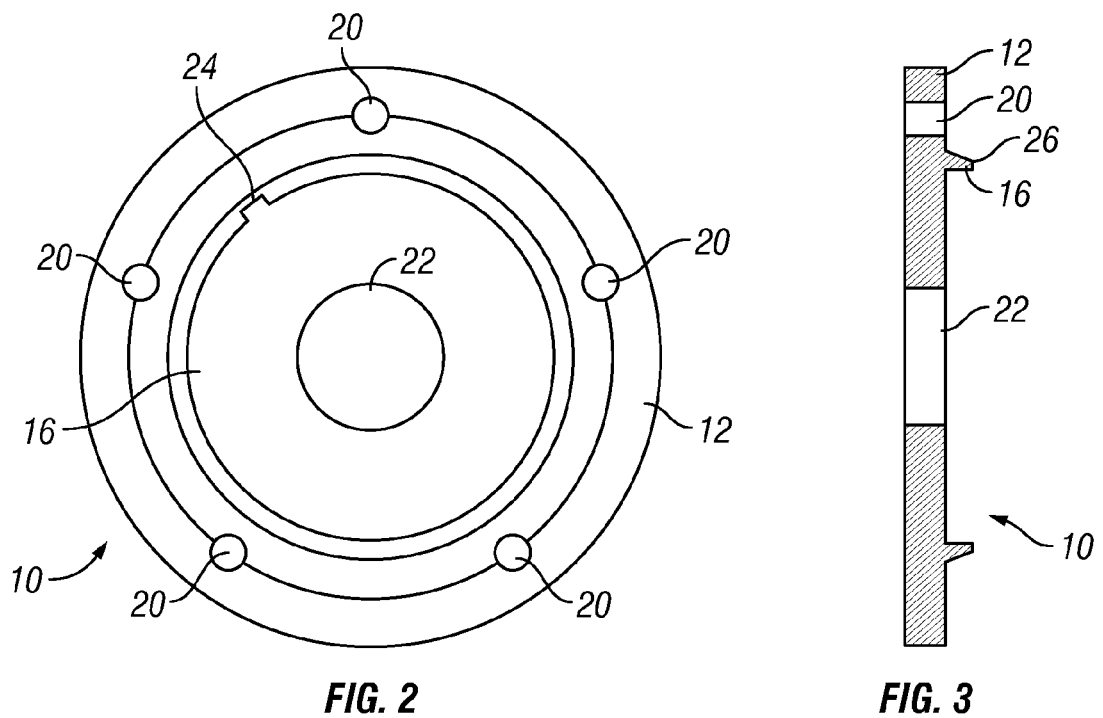
FIG. 2  FIG. 3

MEDALLION DISPLAY APPARATUS FOR MOTORCYCLES

CROSS REFERENCE TO RELATED APPLICATIONS

The present application claims the benefit of the filing date of U.S. Provisional Patent Application Ser. No. 61/216,594, filed May 19, 2009, and U.S. Provisional Patent Application Ser. No. 61/274,622, filed Aug. 19, 2009. The foregoing applications are incorporated by reference in their entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to holders and displays for decorative articles, and more particularly to an improved display apparatus for medallions, challenge coins, and the like.

BACKGROUND INFORMATION AND DISCUSSION OF RELATED ART

U.S. Pat. No. 5,424,137 to Stagl discloses a sportsball and medallion holder which comprises a first hemisphere and a second hemisphere of similar diameter, each hemisphere having a circular edge in abutment along a parting line to form a hollow sphere. A slot is formed in the sphere on the parting line and extends inwardly from an outer surface through the wall of the sphere. A medallion holder includes a mounting having an outer surface whereon a medallion is fastened, and a plate for engaging the sphere, the plate being connected transversely to the mounting by a first portion having a cross-section that fits in the slot. The sportsball and medallion holder are assembled with the hemispheres forming a sphere and the mounting means for a medallion located outside the sphere with the first portion being retained in the slot. Edges of the hemispheres fit congruently into notches in the plate.

U.S. Pat. No. 6,752,119 Coleman describes a removable timing chain cover mounted to a fixed frame. The removable cover may contain a harmonic balancer seal retainer for quickly replacing the harmonic balancer seal and a removable cam timing cover for adjusting the cam timing. A timing marker may be positioned for different harmonic balancer sizes as well as being circumferentially adjustable for precise positioning. Further, a timing chain tensioner may be mounted to the frame.

U.S. Pat. No. 6,805,213 Seffernick, et al. teaches a grille for a motor vehicle which provides a port giving access to the cooling system surge tank. The port is closed by a cover which is removable and replaceable without the use of tools. The cover can carry on an outside face a badge or medallion of the manufacturer. While the cover is removable from the frame in the grille, theft is discouraged by a cord connected between the cover and the vehicle itself. Cutting or breaking the cord does not result in damage to the grille.

U.S. Pat. No. 7,237,683 to Hammers discloses a display device for displaying coins, medals and medallions. The display device is designed to focus the viewer's attention on the object on display without blocking a substantial portion of the object from the view. Additionally, that invention provides a display device suitable for displaying a coin, medal or medallion along with a related secondary object. Finally, that invention provides a device suitable for display a plurality of coins, medals or medallions.

U.S. Pat. No. 7,437,840 to Ratmansky, et al. describes a memorabilia apparatus in which indicia are imprinted on a medallion using convention minting technology. An ice hockey puck or a model of a tire has a cavity adapted to receive and to support the medallion for display. The cavity of the puck or model of a tire exerts a pre-selected force upon the medallion over a pre-selected area, holding the medallion in place during handling while allowing a collector to release the medallion from the puck or model of the tire. Alternatively, resilient or spring retaining members releasably engage the puck or model of the tire and the medallion.

U.S. Pat. Nos. D455,375 and D609,611 to Johnson teach designs for a floorboard timing cover and exhaust guard for a motorcycle.

The foregoing patents reflect the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated patents disclose, teach, suggest, show, or otherwise render obvious, either singly or when considered in combination, the invention described and claimed herein.

SUMMARY OF THE INVENTION

The present invention provides a display apparatus for a medallion, challenge coin, or the like, in the form of a motorcycle engine timing cover (points cover) with an integral recess or socket for receiving and retaining the medallion for display on the motorcycle.

In the preferred embodiment, the apparatus comprises a round timing cover member of the same general size and configuration as the stock timing cover for the motorcycle engine to be modified with the inventive apparatus, and includes a plurality of screw holes arrayed around the periphery of the timing cover to correspond to the original screw holes in the engine. A center aperture in the timing cover member enables access to a medallion retained in the cover from the back side of the cover, when the cover is not installed on the motorcycle. The integral recess in the cover preferably comprises a shallow counterbore in the center of the front surface of the timing cover, coaxial with the center aperture. The recess may be defined by a circumferential ridge on the front surface of the cover, to achieve a raised effect for the medallion being displayed. Alternatively, the recess could be formed purely as a counterbore into the front surface of the timing cover, to achieve a flush mount of the medallion.

The original equipment motorcycle engine timing cover is typically located on the lower right side of Harley Davidson V-twin motorcycles. The timing cover on current Harley Davidson models are mounted with either five or two screws, although earlier models may use only two or three screws. Other motorcycle models may require special mounting of the display apparatus.

The desired medallion may be installed into the display apparatus by simply pressing the medallion into the integral recess. In some circumstances, the medallion may be retained in the recess purely by friction fit, or by magnets. Alternatively, and in a preferred embodiment, the medallion may be bonded into the recess with the use of an appropriate adhesive such as a high temperature RTV silicone. In other embodiments, the medallion is secured in the recess by a horizontal set screw, or by the use of oversize screw heads on one or more of the screws used to secure the cover plate to the motorcycle.

To install the display apparatus on the motorcycle, the motorcycle's stock timing cover is removed, and the inventive timing cover with the retained medallion is installed in its place, preferably with button top type stainless steel screws.

The inventive display apparatus thus replaces the stock timing cover on the motorcycle, and does not damage the motorcycle in any way. Even when installed, the apparatus does not impede the air flow over the engine, or hamper engine cooling. For most installations, especially on current motorcycle models, no modifications are necessary, and no drilling is required.

The entire display apparatus can be easily removed from the motorcycle and the original equipment timing cover reinstalled, on those occasions when it is desired to return the motorcycle to stock condition. The medallion itself may be removed from the display apparatus by inserting a tool through the center aperture the back side of the cover and prying the medallion away from the cover. Alternatively, a small notch may be incorporated into the front surface of the cover along the circumference of the recess, to enable insertion of a screwdriver tip or other tool to pry the medallion from the front of the cover.

The display apparatus is preferably constructed of hot rolled steel or similar material. Various finishes may be used, including polished chrome, powder coating, anodizing, or custom paint. The outside surface of the cover may optionally include angles, cutouts, scallops, custom edges, notches, chamfers, tooling, inclined surfaces, flat, or other surface features.

The cover may be used as a display apparatus for medallions (such as professional or service medallions), challenge coins, personal pieces, and the like. Such articles are often 1¾ inches or 1½ inches in diameter, though other sizes are also contemplated in the scope of this invention. The integral recess of the inventive display apparatus may be constructed in any size to accommodate any sized piece. The medallion-retaining recess feature of the inventive display apparatus may also be integrated into other components of a motorcycle, such as the horn cover, primary cover, air cleaner, fender, etc. Alternatively, the recess and medallion retaining feature of the inventive display apparatus may be incorporated into a universal coin mount which can itself be mounted to a motorcycle, car, boat, or any other article to facilitate display of a medallion.

The inventive apparatus thus provides a display apparatus for medallions and the like that is light, durable, and rigid, and can withstand heat and adverse weather conditions. When properly installed, the medallion will not inadvertently fall out of the cover, even at high speeds or in high temperatures.

It is therefore an object of the present invention to provide a new and improved display apparatus for medallions, challenge coins, and the like.

It is another object of the present invention to provide a new and improved apparatus that may be mounted to a motorcycle to display medallions or the like.

A further object or feature of the present invention is a new and improved medallion display apparatus that does not damage the motorcycle in any way, does not impede the air flow over the engine, or hamper engine cooling.

An even further object of the present invention is to provide a novel display apparatus can be easily removed from the motorcycle when it is desired to return the motorcycle to stock condition.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a view of a medallion display apparatus of this invention as mounted on a motorcycle engine, with a medallion installed and retained in the center recess;

FIG. 2 is a front elevation view of a display apparatus of this invention before installation of a medallion; and FIG. 3 is a side elevation cross-sectional view of the display apparatus of FIG. 2.

DETAILED DESCRIPTION OF THE INVENTION

Referring to FIGS. 1 through 3, wherein like reference numerals refer to like components in the various views, there is illustrated therein a new and improved medallion display apparatus for motorcycles, generally denominated 10 herein.

FIG. 1 illustrates a medallion display apparatus 10 of this invention in the form of an aftermarket timing cover 12 as mounted on a motorcycle engine E, with a medallion 14 installed and retained in the center recess 16 of the timing cover (points cover) 12. The timing cover 12 is secured to the engine E by five screws 18, just as the original equipment timing cover had been secured to the engine.

FIG. 2 is a front elevation view of a display apparatus 10 of this invention before installation of a medallion. Apparatus 10 preferably consists of a timing cover member 12 in the form of a round plate of the same general size and configuration as a stock timing cover for the motorcycle engine to be modified with the inventive apparatus (e.g., 3.060 overall diameter). Timing cover 12 includes five screw holes 20 (e.g., 0.187 inches diameter) arrayed around the periphery of the timing cover at 72 degree spacing, to mate with the original screw holes in the engine. Screw holes 20 may be countersunk or counterbored as desired, to accommodate the five mounting screws 18 (FIG. 1), and achieve the desired aesthetics. Center aperture 22 enables access to a mounted medallion from the back side of the cover (not illustrated), and may be 0.75 inches in diameter. Recess 16 preferably consists of a shallow (e.g., 0.156 inches) counterbore in the center of the front surface of the timing cover, and may be 1.812 inches in diameter for a typical 1¾ inch medallion. Other recess depth and width dimensions may be used as necessary to accommodate the dimensions of the particular medallion to be mounted and displayed. Notch 24 may be incorporated into the front surface of the cover 12 along the circumference of the recess 16, to enable insertion of a screwdriver tip or other tool to pry the medallion from the front of the cover.

FIG. 3 is a side elevation cross-sectional view of the display apparatus 10 of FIG. 2. Cover 12 may be of any suitable thickness (e.g., 0.195 to 0.245 inches). Recess 16 may be defined by circumferential ridge 26, which may have a chamfered outside edge (e.g., 45 to 60 degrees) for improved aesthetics. Alternatively, recess 16 could be formed purely as a counterbore into the timing cover, to achieve a flush mount of the medallion.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed is:

1. An apparatus for the display of a medallion on a motorcycle, said apparatus comprising: a cover member with an integral counterbore located on a front surface of said cover member for receiving and retaining a medallion for display; a plurality of screw holes arrayed around the periphery of said cover member adapted to mate with the original timing cover screw holes in a motorcycle engine; a center aperture in said cover member to enable access to a medallion mounted in said cover member integral counterbore from the back side of said cover member, wherein a medallion may be installed into said display apparatus by pressing the medallion into said integral counterbore, and said cover member may be installed on a motorcycle engine in place of the motorcycle's stock timing cover to display the medallion on the motorcycle.

2. The apparatus for the display of a medallion on a motorcycle of claim 1 wherein said integral counterbore includes a notch to enable insertion of a tool to facilitate removal of a medallion from the apparatus.

3. The apparatus of claim 1 wherein said integral counterbore further comprises a circumferential ridge located on said front surface of said cover member.

4. The apparatus of claim 3 wherein said apparatus is adapted to be integrated into other components of a motorcycle.

5. The apparatus of claim 3 wherein said circumferential ridge includes a notch to enable insertion of a tool to facilitate removal of a medallion from the apparatus.

6. The apparatus of claim 3 wherein the counterbore medallion retaining feature of the inventive display apparatus may be incorporated into a universal coin mount which can itself be mounted to another article to facilitate display of a medallion.

7. The apparatus of claim 1 wherein said apparatus is adapted to be integrated into other components of a motorcycle.

8. The apparatus of claim 1 wherein the counterbore medallion retaining feature of the inventive display apparatus may be incorporated into a universal coin mount which can itself be mounted to another article to facilitate display of a medallion.

* * * * *